US012129708B2

(12) United States Patent
Lambridis et al.

(10) Patent No.: US 12,129,708 B2
(45) Date of Patent: Oct. 29, 2024

(54) SLATTED DOOR WITH INCREASED IMPACT RESISTANCE

(71) Applicant: McKeon Rolling Steel Door Co., Inc., Bellport, NY (US)

(72) Inventors: Andrew C. Lambridis, Dix Hills, NY (US); Ashraf Gomaa, Stony Brook, NY (US)

(73) Assignee: MCKEON ROLLING STEEL DOOR CO., INC., Bellport, NY (US)

( * ) Notice: Subject to any disclaimer, the term of this patent is extended or adjusted under 35 U.S.C. 154(b) by 290 days.

(21) Appl. No.: 17/841,293

(22) Filed: Jun. 15, 2022

(65) Prior Publication Data

US 2022/0396998 A1 Dec. 15, 2022

Related U.S. Application Data

(60) Provisional application No. 63/210,778, filed on Jun. 15, 2021.

(51) Int. Cl.
*E06B 9/17* (2006.01)
*E06B 9/15* (2006.01)
(Continued)

(52) U.S. Cl.
CPC .................. *E06B 9/17* (2013.01); *E06B 9/15* (2013.01); *E06B 9/581* (2013.01); *E06B 2009/1516* (2013.01); *E06B 2009/1544* (2013.01); *E06B 2009/1583* (2013.01); *E06B 2009/17069* (2013.01); *E06B 9/70* (2013.01)

(58) Field of Classification Search
CPC ... E06B 9/17; E06B 9/15; E06B 9/581; E06B 2009/1516; E06B 2009/1544; E06B 2009/1583; E06B 2009/17069; E06B 9/70; E06B 2009/1533; E06B 2009/1538; E06B 2009/1594; E06B 2009/1577; E06B 2009/1588; E06B 2009/1505; E06B 2009/1522; E06B 9/11; E06B 9/08
See application file for complete search history.

(56) References Cited

U.S. PATENT DOCUMENTS 546,858 A 9/1895 Kinnear
603,106 A 4/1898 Kinnear
(Continued)

OTHER PUBLICATIONS

Notice of Allowance dated Dec. 20, 2022 issued in U.S. Appl. No. 17/000,720.
(Continued)

*Primary Examiner* — Beth A Stephan
(74) *Attorney, Agent, or Firm* — Cozen O'Connor

(57) ABSTRACT

A shutter roller door with a shutter roller drivable by a drive mechanism; a flexible door windable on the roller and movable between retracted and extended positions by the drive mechanism, the door having integrally formed interconnected slats, each having upper and lower edges, and arranged perpendicular to a direction of door travel; a guide rail assembly positioned at each side; and end members attachable to an end of a corresponding slat. Each slat has an upper hook portion and an upper curved channel, the upper hook portion configured to engage with a lower curved channel of the lower edge of an upper adjacent slat, and the lower edge having a lower hook portion and a lower curved channel configured to engage with the upper curved channel of the upper edge of a lower adjacent slat.

15 Claims, 19 Drawing Sheets

(51) Int. Cl.
*E06B 9/58* (2006.01)
*E06B 9/70* (2006.01)

(56) References Cited

U.S. PATENT DOCUMENTS

| | | | |
|---|---|---|---|
| 671,444 | A | 4/1901 | Kinnear |
| 675,953 | A | 4/1901 | Kinnear |
| 800,249 | A | 9/1905 | Vance |
| 806,174 | A | 12/1905 | McCloud |
| 827,677 | A | 9/1906 | Vance |
| 830,456 | A | 9/1906 | Schultes |
| 866,894 | A | 9/1907 | Vance |
| 876,593 | A | 1/1908 | Rush |
| 880,701 | A | 3/1908 | Vance |
| 897,990 | A | 9/1908 | McCloud |
| 926,139 | A | 6/1909 | Rush |
| 994,440 | A | 6/1911 | Brunst |
| 1,013,945 | A | 1/1912 | McCloud |
| 1,014,315 | A | 1/1912 | McCloud |
| 1,081,485 | A | 12/1913 | Cahill |
| 1,198,939 | A | 9/1916 | McDowell |
| 1,352,656 | A | 9/1920 | Cahill |
| 1,367,240 | A | 2/1921 | Cornell |
| 1,406,303 | A | 2/1922 | Tomkinson |
| 1,408,076 | A | 2/1922 | Claveria |
| 1,437,947 | A | 12/1922 | Probert |
| 1,579,915 | A | 4/1926 | Cornell |
| 1,643,074 | A | 9/1927 | Lavagnino |
| 1,707,287 | A | 4/1929 | Sudzki |
| 1,720,850 | A | 7/1929 | Negrini |
| 1,872,652 | A | 8/1932 | Best |
| 1,908,634 | A | 5/1933 | Kendall |
| 1,989,513 | A | 1/1935 | Greegor |
| 2,019,379 | A | 10/1935 | Anderson |
| 2,063,159 | A | 12/1936 | Groove |
| 2,099,408 | A | 11/1937 | Packert |
| 2,164,681 | A | 7/1939 | Fould |
| 2,183,495 | A | 12/1939 | Laufersweiler |
| 2,301,845 | A | 11/1942 | Anderson |
| 2,898,988 | A | 8/1959 | Zoll |
| 2,912,048 | A | 11/1959 | Colom |
| 2,954,081 | A | 9/1960 | Recchione |
| 3,067,814 | A | 12/1962 | Anthony |
| 3,076,499 | A | 2/1963 | Zoll |
| 3,076,500 | A | 2/1963 | Zoll |
| 3,127,962 | A | 4/1964 | James |
| 3,131,794 | A | 5/1964 | Bender |
| 3,481,094 | A | 12/1969 | Taylor |
| 3,489,200 | A | 1/1970 | Recchione |
| 3,712,258 | A | 1/1973 | Bauer |
| 3,756,137 | A | 9/1973 | Scharres |
| 4,173,247 | A | 11/1979 | Piana |
| 4,223,503 | A | 9/1980 | Hague |
| 4,282,920 | A | 8/1981 | Kremm |
| 4,382,460 | A | 5/1983 | Ben-Tal |
| 4,436,136 | A | 3/1984 | Downey |
| 4,470,444 | A | 9/1984 | Riexinger |
| 4,532,973 | A | 8/1985 | DeFalco |
| 4,628,982 | A | 12/1986 | Labelle |
| 4,630,664 | A | 12/1986 | Magro |
| 4,715,421 | A | 12/1987 | Erber |
| 4,723,588 | A | 2/1988 | Ruppel |
| 4,846,247 | A | 7/1989 | Kessler |
| 4,972,894 | A | 11/1990 | Machill |
| 4,979,553 | A | 12/1990 | Lowry |
| 5,040,843 | A | 8/1991 | Russell |
| 5,165,746 | A | 11/1992 | Teigen |
| 5,246,054 | A | 9/1993 | Shepherd |
| 5,253,694 | A | 10/1993 | Bernardo |
| 5,330,246 | A | 7/1994 | Bernardo |
| 5,365,990 | A | 11/1994 | Ueda |
| 5,419,386 | A | 5/1995 | Magro |
| 5,515,902 | A | 5/1996 | Hoffman |
| 5,673,740 | A | 10/1997 | Park |
| 5,725,201 | A | 3/1998 | Parth |
| 5,782,283 | A | 7/1998 | Kendall |
| 5,921,308 | A | 7/1999 | Martin |
| 6,068,040 | A | 5/2000 | Magro |
| 6,129,132 | A | 10/2000 | Denoual |
| 6,591,888 | B2 | 7/2003 | Benedetti |
| 6,631,749 | B1 | 10/2003 | Zabala |
| 6,951,236 | B2 | 10/2005 | Schlater |
| 7,100,665 | B2 | 9/2006 | Miller |
| 7,357,171 | B2 | 4/2008 | Miller |
| 7,464,743 | B1 | 12/2008 | Berger |
| 7,490,654 | B2 | 2/2009 | Gomaa |
| 8,109,316 | B2 | 2/2012 | Wang |
| 8,376,020 | B2 | 2/2013 | Smart |
| 9,211,833 | B2 | 12/2015 | Rusher |
| 9,267,326 | B2 | 2/2016 | Gomaa |
| 9,309,715 | B2 | 4/2016 | Miller |
| 9,534,441 | B2 | 1/2017 | Allen |
| 9,746,289 | B2 | 8/2017 | Hahn |
| 9,915,094 | B2 | 3/2018 | Frede |
| 10,041,291 | B2 | 8/2018 | Miller |
| 10,253,557 | B2 | 4/2019 | Frede |
| 10,344,527 | B2 | 7/2019 | Balbach |
| 10,435,943 | B2 | 10/2019 | Rowley |
| 10,465,440 | B2 | 11/2019 | Miller et al. |
| 10,731,347 | B2 | 8/2020 | Parsons et al. |
| 10,794,112 | B2 | 10/2020 | Lambridis |
| 11,047,170 | B2 | 6/2021 | Wong |
| 11,512,523 | B2 | 11/2022 | Dawdy |
| 2001/0035270 | A1 | 11/2001 | Erber |
| 2003/0024659 | A1 | 2/2003 | Begni |
| 2003/0047291 | A1 | 3/2003 | Klein |
| 2004/0188037 | A1 | 9/2004 | Schlater |
| 2005/0205223 | A1 | 9/2005 | Miller |
| 2006/0027346 | A1 | 2/2006 | Hsieh |
| 2007/0131358 | A1 | 6/2007 | Iwasaki |
| 2007/0137802 | A1 | 6/2007 | Lukasik |
| 2007/0193701 | A1 | 8/2007 | Petrick |
| 2009/0235602 | A1 | 9/2009 | Ceccofiglio |
| 2011/0108210 | A1 | 5/2011 | Wang |
| 2012/0055637 | A1 | 3/2012 | Marinetti |
| 2014/0053991 | A1 | 2/2014 | Miller |
| 2015/0003617 | A1 | 2/2015 | Frede |
| 2015/0322711 | A1 | 11/2015 | Rowley |
| 2015/0368962 | A1 | 12/2015 | Motosko |
| 2017/0022753 | A1 | 1/2017 | Allen |
| 2017/0067285 | A1 | 3/2017 | Lambridis |
| 2018/0044977 | A1 | 2/2018 | Bonnell |
| 2019/0178032 | A1 | 6/2019 | McNabb |
| 2019/0301237 | A1 | 10/2019 | Magro |
| 2019/0390511 | A1 | 12/2019 | Lambridis |

OTHER PUBLICATIONS

Office Action dated Sep. 16, 2022 issued in U.S. Appl. No. 17/000,720.

SLATTED DOOR WITH INCREASED IMPACT RESISTANCE

CROSS-REFERENCE TO RELATED APPLICATION

This application claims benefit of U.S. provisional application No. 63/210,778, filed Jun. 15, 2021, the contents of which are incorporated herein by reference in their entirety.

BACKGROUND OF THE INVENTION

1. Field of the Invention

This application relates to doors, in particular, rolling or coiling slatted doors, such as safety doors.

2. Description of the Related Art

Slatted doors such as doors constructed out of a plurality of parallel connected slats, are known and commonly used in selective covering of openings in buildings or between adjacent rooms in buildings, such as garages, entrances, etc. One problem with slatted doors is that they are vulnerable to damage and/or disengagement with the door frame, and/or individual slat when receiving an impact force or exposure to high pressures, such as blowing debris from extreme weather.

There is therefore a need for a slatted door that can withstand high pressure conditions without the use of slats of increased weight.

SUMMARY OF THE INVENTION

According to one aspect of the present invention, a door assembly for covering an opening defined by at least one structural element of a building, the door assembly has: a shutter roller positioned proximate the opening and rotatable about an axis of rotation; a drive mechanism configured to rotate the shutter roller about the axis of rotation; a flexible door having an outward face and windable on and off the shutter roller such that the flexible door is movable between retracted and extended positions by operation of the drive mechanism, the flexible door having a plurality of interconnected slats, each slat being integrally formed in one piece, each having two ends, an upper edge and a lower edge, and each being arranged along a direction perpendicular to a direction of travel of the door; a guide rail assembly positioned at each side of the opening and extending along the direction of travel of the door; and a plurality of end members each attachable to an end of a corresponding slat. The upper edge of each slat has an upper hook portion and an upper curved channel, the upper hook portion being configured to rotatably engage with a lower curved channel of the lower edge of an upper adjacent slat, and the lower edge having a lower hook portion and a lower curved channel configured to rotatably engage with the upper curved channel of the upper edge of a lower adjacent slat. At least when the upper adjacent slat is connected to the lower adjacent slat via the upper and lower hook portions and respective counterpart lower and upper curved channels, the upper and lower adjacent slats engage one another along their respective upper and lower edges to form a reinforcement impact distribution structure extending laterally along the length of the slats. The impact distribution structure is configured to: (a) rotatably secure the upper adjacent and lower adjacent slats to one another, and (b) direct an impact force applied to the door in a direction substantially along the length of said one or more slats.

BRIEF DESCRIPTION OF THE DRAWINGS

In the drawings:

FIG. 2AA is a section view of a single slat for a slatted door in accordance with second aspect of the present invention;

FIG. 2AB is a section view of connected slats of a door in accordance with the second aspect of the invention of FIG. 2AA;

DETAILED DESCRIPTION OF THE PRESENTLY PREFERRED EMBODIMENTS

Figure 1A:
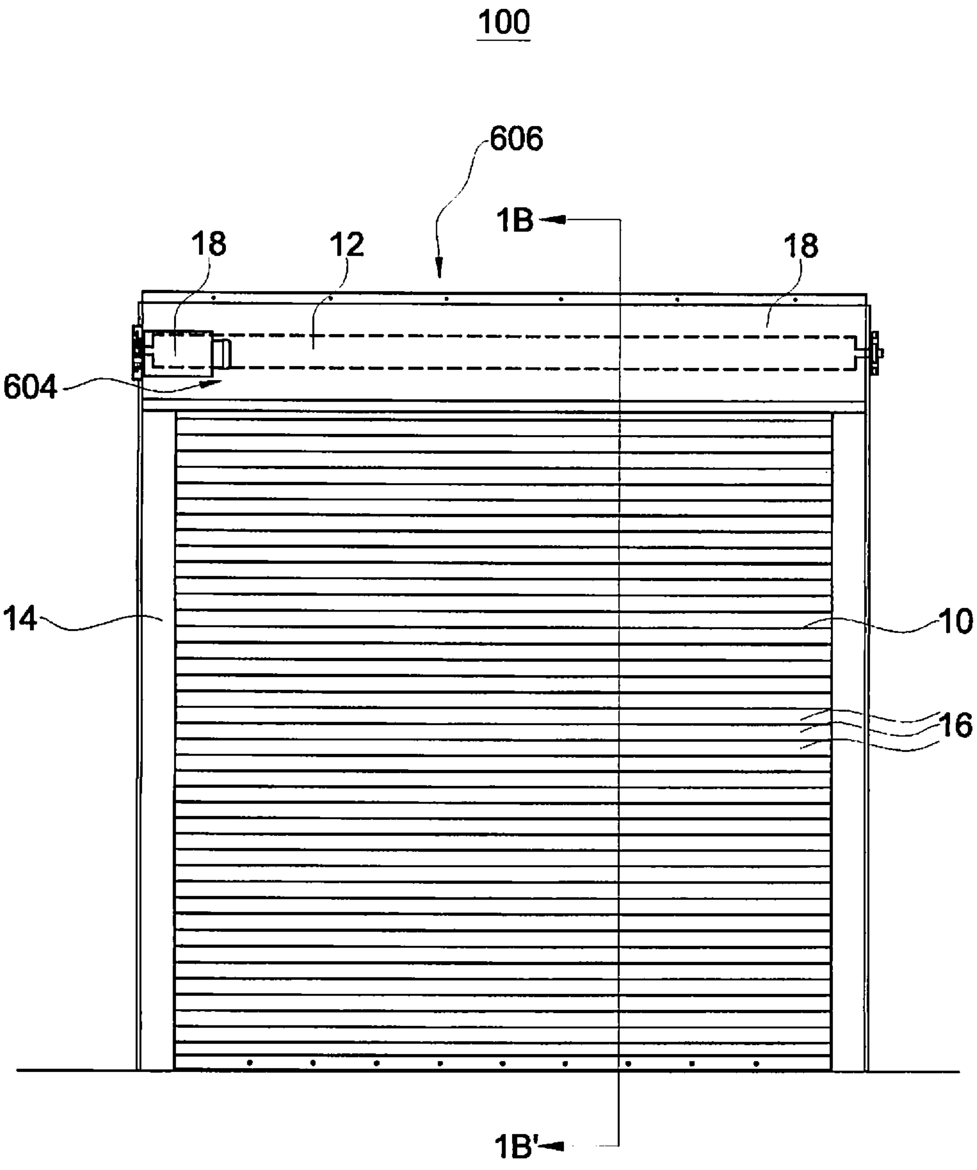
FIGS. 1A and 1B are front elevational and side views, respectively, of a slatted door in accordance with an aspect of the present invention.
Figure 1B:
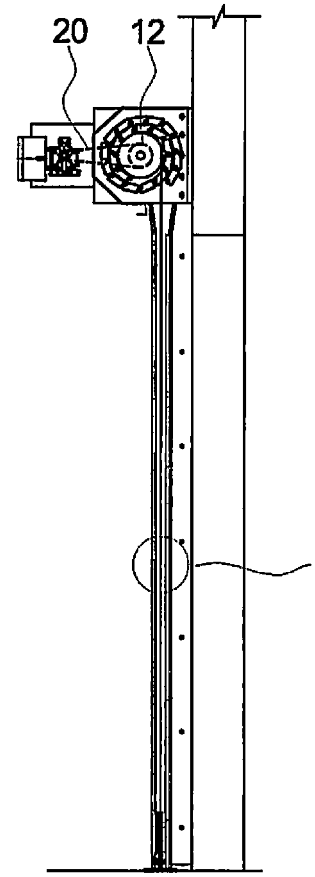

As shown in FIGS. 1A and 1B, a vertical coiling door 100 configuration comprises a door/curtain 10 having a fixed end connected to a horizontally oriented coil pipe 12 located along the top of the vertical coiling door 100, and a free end, such that the door can roll onto and off of the pipe 12, as is known in the art. A guide track assemble includes guide tracks 14 which extend vertically along each edge of the door/curtain 10 to form channels that permit the door/curtain 10, and more particularly ends of slats 16 forming the door/curtain 10, to be guided therein to allow the door to move between a closed and an open position. When the door 100 is in the open position, the door/curtain 10 may be maintained, rolled up partially or entirely on the coil pipe 12. To close the door/curtain 10, rotational force is applied from a motor 18 to the coil pipe 12, for example by a belt/chain 20, to unspool the wound door/curtain 10 from the coil pipe 12.

As shown in FIGS. 1A and 1B, in a vertical coiling door configuration the door/curtain 10 is opened and closed by operation of a drive unit 604, preferably enclosed in a drive unit housing 606 which extends across the top portion of the vertical coiling door. The drive unit 604 includes a motor 18 configured to rotate the coil pipe 12 in either a clockwise or counter-clockwise direction using a belt or chain 20. The motor 18 can be any standard motor operator to drive the coil pipe 12 in the required directions, e.g., the clockwise and counter-clockwise. The coil pipe 12 is configured to rotate in one direction to un-coil the door/curtain 10 when closing the door/curtain 10, and in the opposite direction when retracting the door/curtain 10 to an open position. The coil pipe 12 preferably extends the entire width, from one lateral side of the door/curtain 10 to the other lateral side, along the top of the vertical coiling door. In the open (i.e., retracted) position, the door/curtain 10 is substantially wrapped around the coil pipe 12 for secure storage.

FIG. 1A is an elevational view of the vertical coiling door configuration that utilizes the inventive features of the present invention, and FIG. 1B is a view taken along section 1B-1B'. In the vertical coiling door configuration, two guide tracks 14 are provided, one proximal to each lateral edge of door/curtain 10. Each guide track 14 is affixed to a structural support, for example, a portion of a wall of a building in which the vertical coiling door is installed, for example a masonry wall.

Figure 2A:
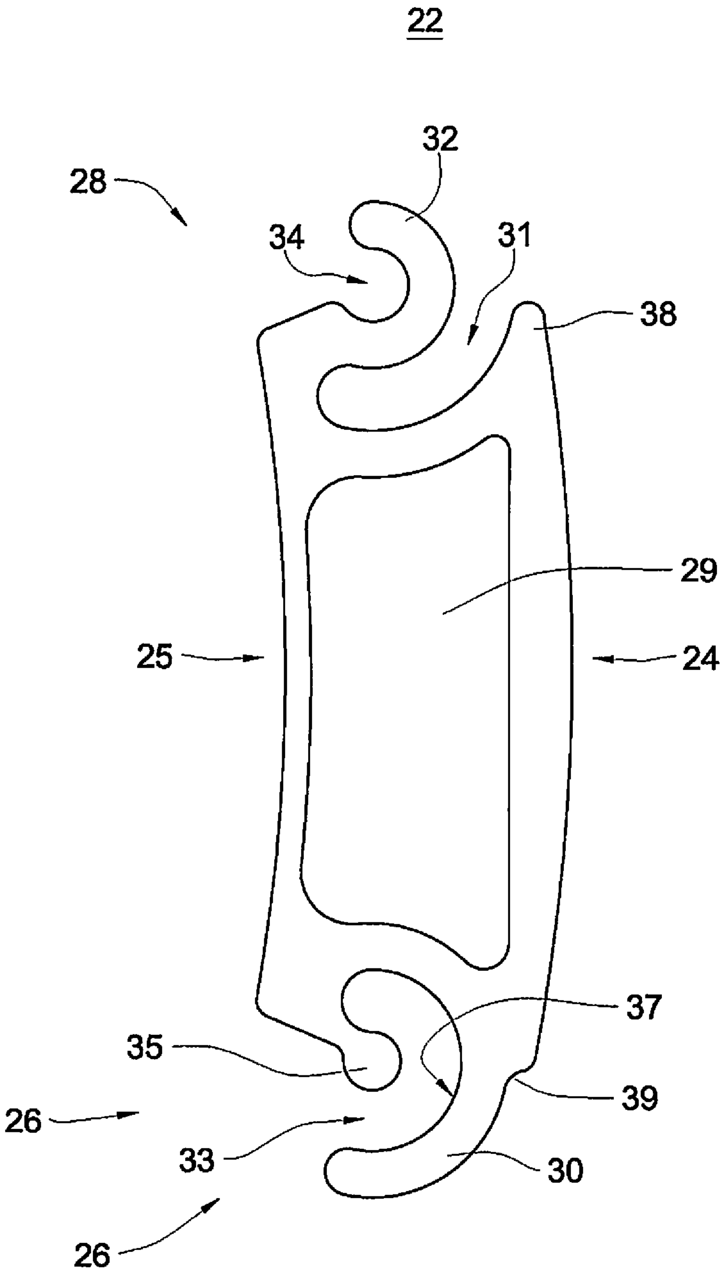
FIG. 2A is a section view of a single slat for a slatted door in accordance with one aspect of the present invention.

FIG. 2A is a cross-sectional view of a slat 22 according to an aspect of the present invention. A series of such slats 22 would be linked together to form the door 10.

In contrast to known slats that are formed from one or more sheet metal layers, the slats 22 in accordance with the present invention are each integrally formed, for example by extrusion of a plastic, a metal or composite-extrudable material, or cast, for example from a molten material, such as aluminum, or stamped, such as a metal suitable for stamping.

With reference to FIG. 2A, each slat 22 has, in a sectional view, what will be referred to as bottom end 26 and a top end 28. Except where a particular slat is located at the very bottom of the door or the very top of the door, the bottom end 26 of a respective slat 22 connects to top end 28 of a lower adjacent slat 22.

In a preferred extruded embodiment, each slat has a central cavity 29, seen in the cross-sectional view as a having generally trapezoidal section profile, but preferably having curved sides. The central cavity extends lengthwise along at least a portion of the longitudinal extent, i.e., the length of the slat.

Each slat 22 comprises a front face 24, a rear face 25, the cavity 29, with the ends 26 and 28 forming the bottom and the top of the slat 22, respectively. A lower hook 30 and an upper hook 32 are formed at the bottom and top ends 26, 28, respectively.

As can be best seen in FIGS. 2B-2D, the lower hook 30 of each slat 22 is configured to engage, typically slidably, a corresponding upper hook 32 of the below adjacent slat. Conversely, the upper hook 32 of each slat is configured to engage, typically slidably, the lower hook 30 of the above adjacent slat.

Additionally, the top end 28 is configured so as to form an upper slot or channel 31 configured to engage the lower hook 30 of the above adjacent slat. The bottom end 26 is configured so as to form a lower slot or channel 33 configured to engage an upper hook 32 of the below adjacent slat.

Figure 2B:
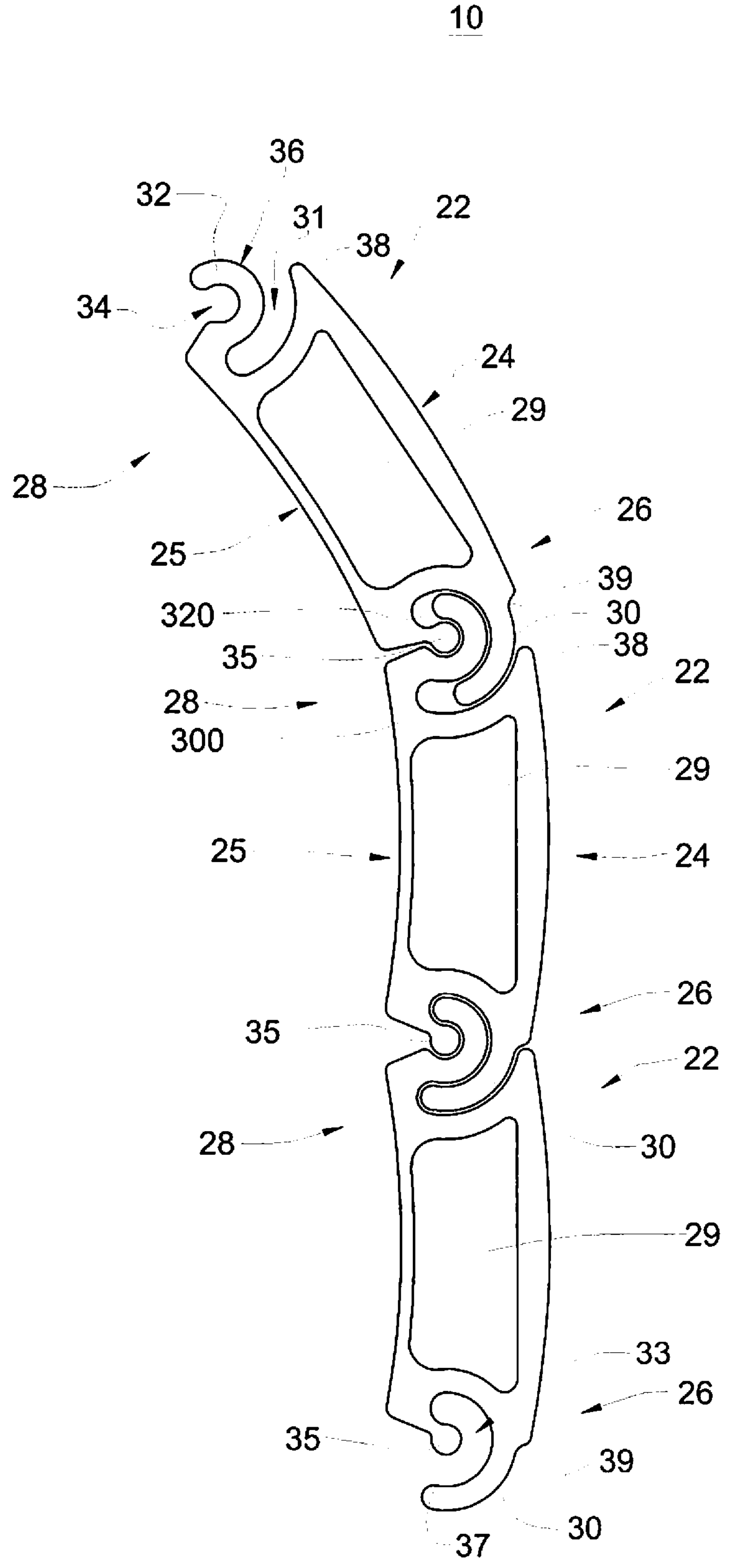
FIGS. 2B-2D are views of connected slats of a door in accordance with one aspect of the invention.
Figure 2C:
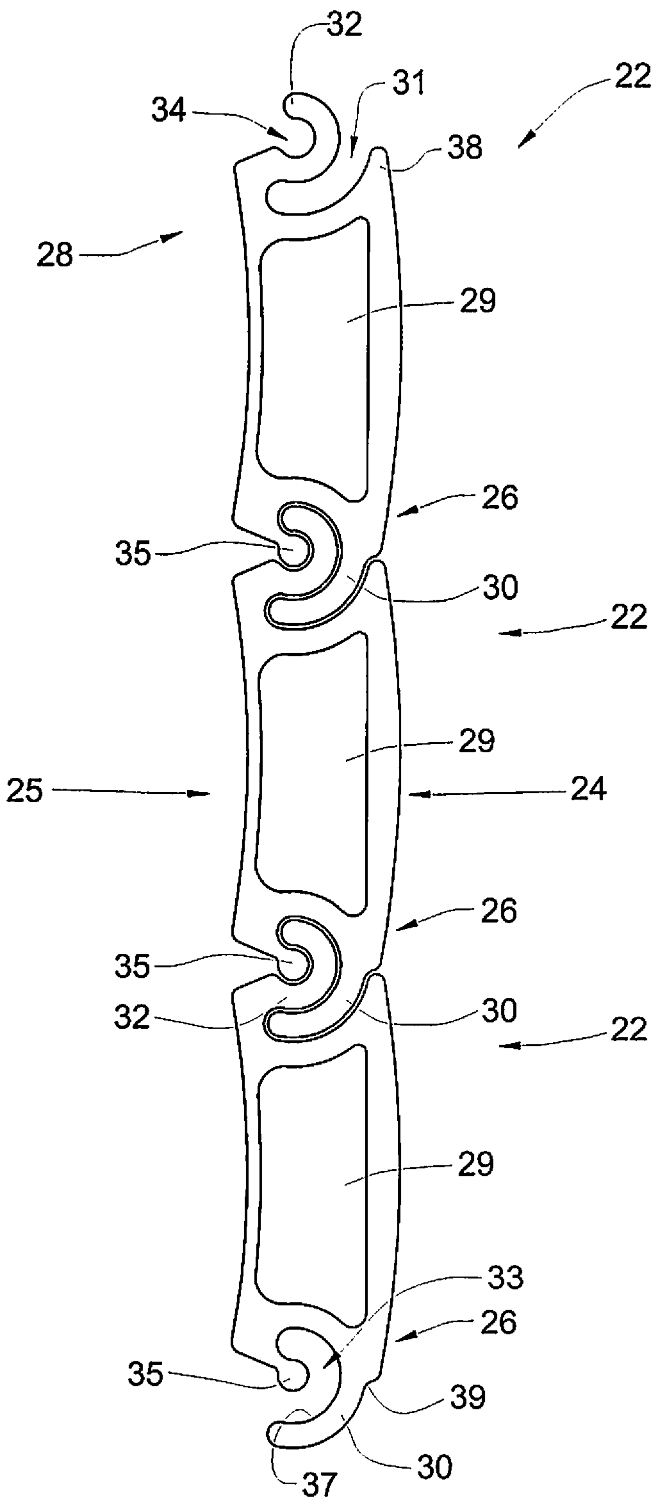

FIGS. 2B and 2C each illustrate three instances of a representative slat 22. FIG. 2B shows the three slats 22 with the lower two in a flat configuration such that two of the front faces 24 are aligned, and the top one angled (i.e., for unwinding or winding up the door). FIG. 2C shows the three representative slats 22 all in the flat configuration with all three front faces 24 aligned.

As can be seen from FIGS. 2A-2D, each slat 22 has, at its bottom end 26 a bead 35. The bead 35 is configured to engage an inward curved portion 34 of the upper hook 32 of the lower adjacent slat 22.

This engagement of the bead 35 of the upper adjacent slat 22 with the upper hook 32 of the lower adjacent slat 22, taken together with the engagement of the outwardly curved portion 36 of the upper hook 32 with an inwardly curved portion 37 of the lower hook 30, provides for reinforcement for the door 10 at the interface between adjacent slats that strengthen against the possibility of an impacting force directed to the front of the door from dislodging the slats from one another.

This reinforcement is further enhanced by the fact that the front of the slat 22 at the top end 28, has a tapered tip 38 and the front of the slat 22 at the bottom end 26 has a seat 39. The seat 39 is configured so that, when adjacent slats 22 are configured in a flat configuration, i.e., the portion of the door including those slats is flat, the tapered tip 38 of a lower adjacent slat is supported in the seat 39 of the upper adjacent slat.

By virtue of the above-described structure, in a rolled down deployed condition of the door 10, when the front faces 24 of the slats are substantially flat with respect to one another, the deployed door 10, at the adjoining portions of any of the adjacent slats in a flat portion of the door, that is in a deployed portion, effectively has a multi-layer reinforcement the components of which are, i.e., the bead 35, the upper hook 32 and the lower hook 30 and the seated tapered tip 38, which line up outwardly to provide reinforcement from a force impacting the door from the front.

The engaged hooks 32, 30, the bead 35 and the tapered tip 38 of the slats 22 thus form a lateral reinforcement impact distribution structure, distributing impact forces in a direction along the slat length. By virtue of such impact distribution structure, the door slats 22 are less likely to separate from each other, and are less likely to be dislodged from the guide tracks 14, when the door is impacted at the front by debris or the like. Thus, such configurations result in an improved robust door.

Figure 2D:
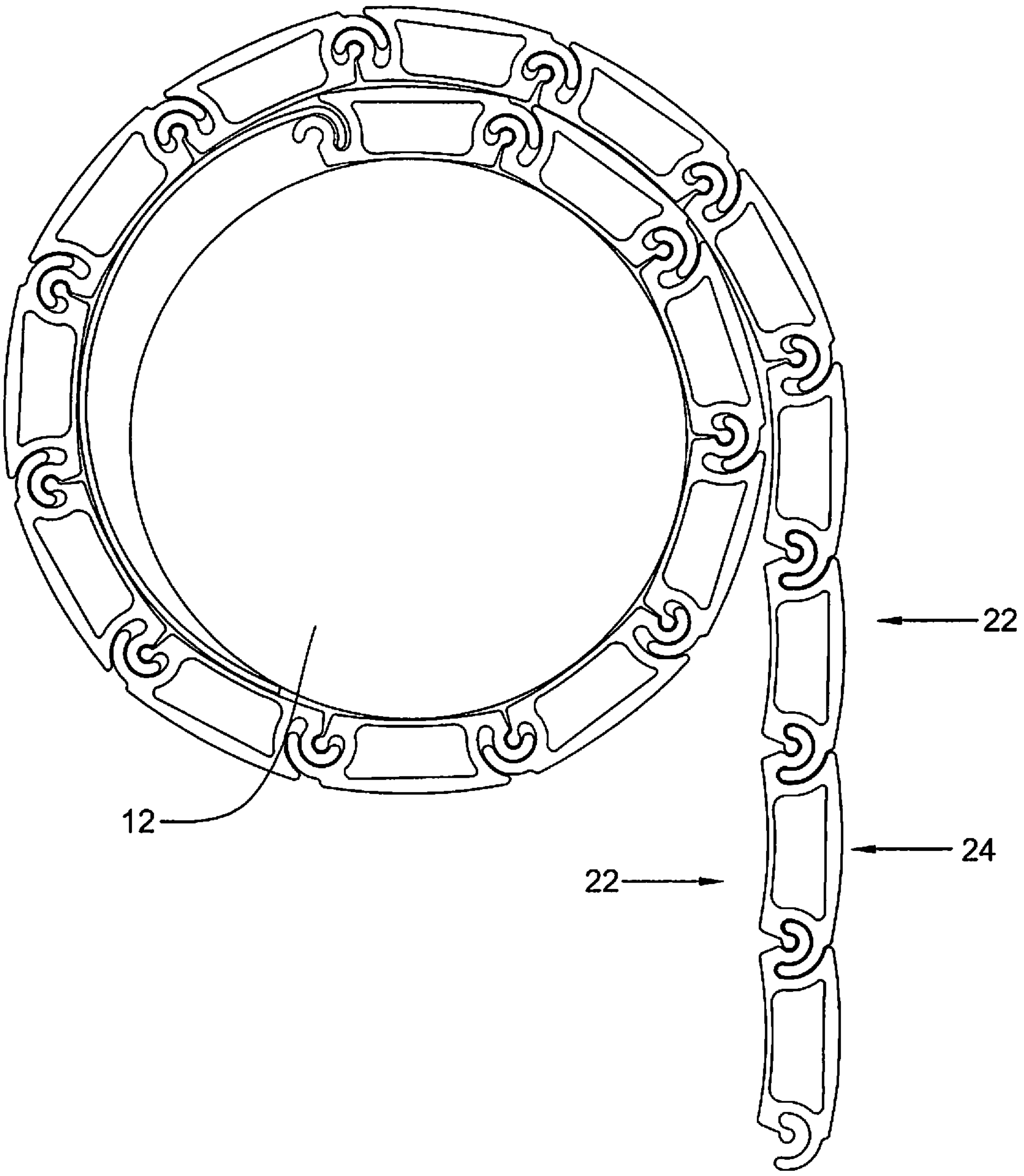
Figure 2A:
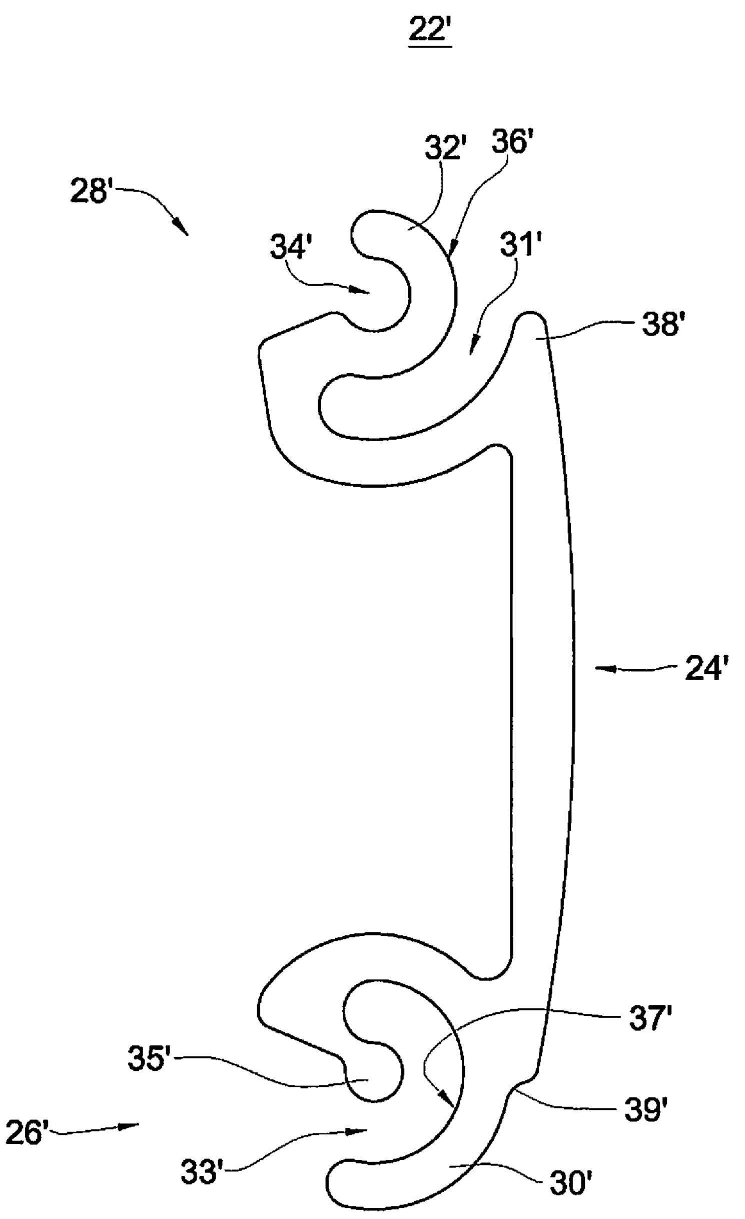
Figure 2A:
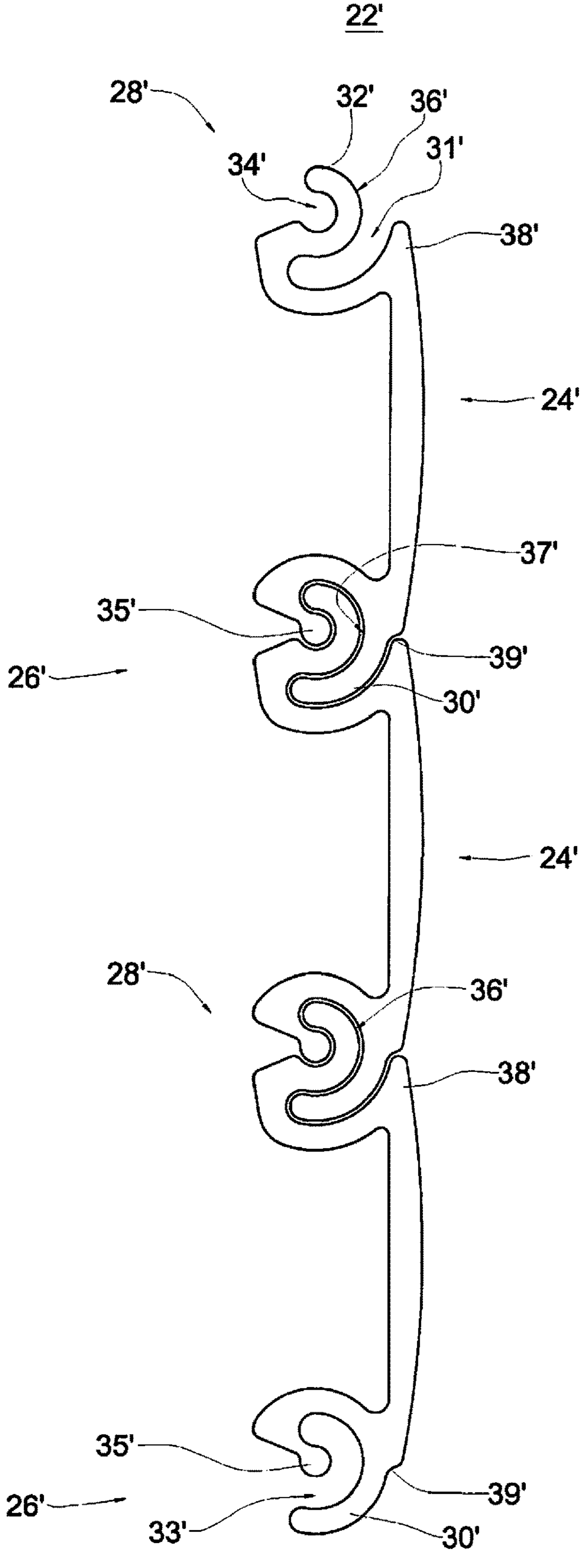

FIG. 2D shows a number of slats 22, some of which are rolled on the roller barrel 12, and hence curved with respect to adjacent slats, and some of which are not rolled up, and hence flat with respect to adjacent slats. When the adjacent slats are angled, i.e., not flat with respect to one another, rotation of the respect top and bottom ends causes the multi-layer reinforcements to no longer align. As can be seen in FIG. 2D, this condition pervades for all of the slats that are rolled up on the coil pipe 12 at any given time. In this rolled condition, also visible at the top of FIG. 2B, gaps 300, 320 exist from the end of each of the hooks 30 and 32, respectively, to the end of the respective receiving channels 31 and 33 in the adjacent slats.

FIGS. 2AA and 2AB show a slat 22' that connects with other instances of the slat 22' in the same manner as the slat 22 discussed above in relation to FIGS. 2A to 2D, but which do not include a central cavity 29.

FIG. 2AA is a cross-sectional view of a slat 22' according to a second aspect of the present invention. A series of such slats 22' would be linked together to form the door 10.

Just as in the case of the slats 22 in accordance with the first aspect of the present invention, the slats 22' are each integrally formed, for example by extrusion of a plastic, a metal or composite extrudable material, or cast, for example from a molten material, such as aluminum, or stamped, such as a metal suitable for stamping.

Each slat 22' has, in a sectional view, what will be referred to as bottom end 26' and a top end 28'. Except where a particular slat is located at the very bottom of the door or the very top of the door, the bottom end 26' of a respective slat 22' connects to top end 28' of a lower adjacent slat 22'.

Each slat 22' comprises a front face 24', with the ends 26' and 28' forming the bottom and the top of the slat 22', respectively. A lower hook 30' and an upper hook 32' are formed at the bottom and top ends 26', 28', respectively.

As can be seen in FIG. 2AB, the lower hook 30' of each slat 22' is configured to engage, typically slidably, a corresponding upper hook 32' of the below adjacent slat. Conversely, the upper hook 32' of each slat is configured to engage, typically slidably, the lower hook 30' of the above adjacent slat.

Additionally, the top end 28' is configured so as to form an upper slot or channel 31' configured to engage the lower hook 30' of the above adjacent slat. The bottom end 26' is configured so as to form a lower slot or channel 33' configured to engage an upper hook 32' of the below adjacent slat.

FIG. 2AB illustrates three instances of a representative slat 22' according to the second aspect, all in the flat configuration with all three front faces 24' aligned.

As can be seen from FIGS. 2AA and 2AB, each slat 22' has, at its bottom end 26', a bead 35'. As can be seen in these figures, the bead 35' is configured to engage an inward curved portion 34' of the upper hook 32' of the lower adjacent slat 22'.

This engagement of the bead 35' of the upper adjacent slat 22' with the upper hook 32' of the lower adjacent slat 22', taken together with the engagement of the outwardly curved portion 36' of the upper hook 32' with an inwardly curved portion 37' of the lower hook 30', provides for reinforcement for the door 10 at the interface between adjacent slats that strengthen against the possibility of an impacting force directed to the front of the door from dislodging the slats from one another.

This reinforcement is further enhanced by the fact that the front of the slat 22' at the top end 28', has a tapered tip 38' and the front of the slat 22' at the bottom end 26' has a seat 39'. The seat 39' is configured so that, when adjacent slats 22' are configured in a flat configuration, i.e., the portion of the door including those slats is flat, the tapered tip 38' of a lower adjacent slat is supported in the seat 39' of the upper adjacent slat.

By virtue of the above-described structure, in a rolled down deployed condition of the door 10, when the front faces 24' of the slats 22' according to this second aspect are flat with respect to one another, the deployed door 10, at the adjoining portions of any of the adjacent slats in a flat portion of the door, that is in a deployed portion, effectively has a multi-layer reinforcement the components of which, i.e., the bead 35', the upper hook 32' and the lower hook 30' and the seated tapered tip 38', line up outwardly to provide reinforcement from a force impacting the door from the front.

The engaged hooks 32', 30', the bead 35' and the tapered tip 38' of the slats 22' thus form a lateral reinforcement impact distribution structure, distributing impact forces in a direction along the slat length. By virtue of such impact distribution structure, the door slats 22' according to the second aspect are less likely to separate from each other, and are less likely to be dislodged from the guide tracks 14, when the door is impacted by debris or the like. Thus, such configurations result in an improved robust door.

It is noted that except for the lack of a back face and cavity, the slats 22' according to the second aspect would wind up on the roller barrel 12 in the manner shown and discussed above in relation to FIG. 2D.

FIGS. 3A to 3D show a force distribution chain assembly 57 and illustrate how such an assembly 57 engages with a slatted door 10 in an aspect of the present invention. Force distribution chain assembly 57 comprises a series of end members, each of which is attached to an end of a door slat 22. In some configurations, the end members may be attached to adjacent end members, although it is not a requirement that the end member be attached to other end members.

More importantly, each end member has an extending portion 63 or force dampener which extends in a direction away from the front side 24 of the slats 22. Each extending portion 63 is configured to overlap an adjacent extending portion 63 of an adjacent slat. The overlap portions can be coupled to each other or simply arranged in an overlap configuration with sufficient spacing such that a force applied to the front 24 of a slat (i.e., a "subject slat") will travel to the associated end member, to the extending portion and then, as a result of the direct coupling or close proximity arrangement, to the extending portions 63 of slats adjacent the subject slat. This arrangement provides a force dampening effect.

The end members can be in the form of a windlock 60 or an endlock 61. As will be described below, the difference between a windlock 60 and an endlock 61 is an additional structure, referred to as a windlock wing member 62, which engages the railing of the guide track 14 to prevent excessive bowing of the door 10 which could cause disengaging of the door from the railing.

Figure 3A:
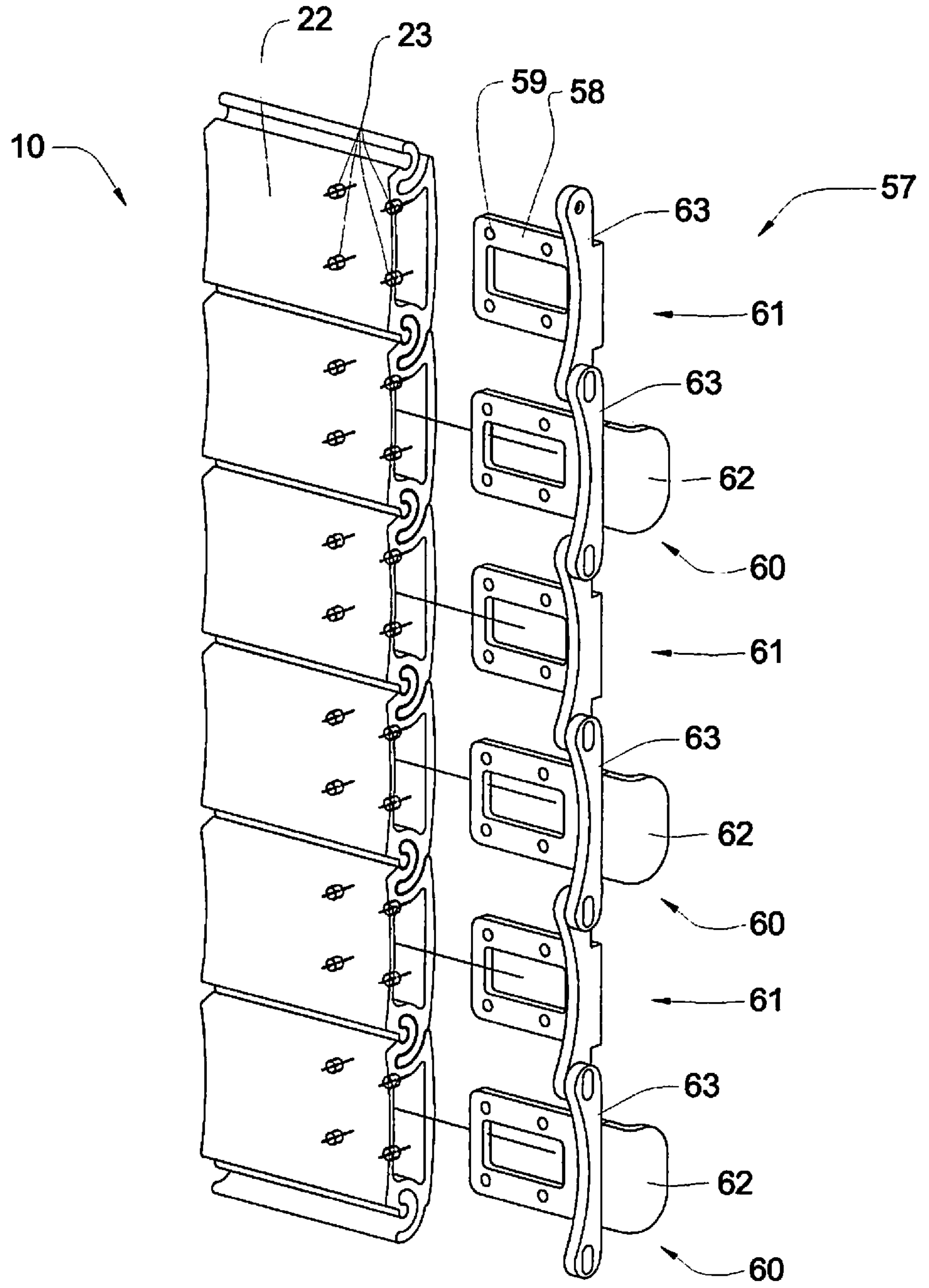
FIGS. 3A-3D are views of slats of a door engaging with a chain assembly in accordance with an aspect of the present invention.

FIG. 3A is an exploded view of an end of the door 10, made up of a plurality of the slats 22, and the chain assembly 57 to which the end of the door 10 is to be connected. The ends of each slat 22 have mounting holes 23 which, when the front panel slats 22 and the chain assembly 57 are lined up for connection, rivet holes 59 in a rectangular portion 58 of each windlock 60 and each endlock 61 are aligned. Each windlock 60 and endlock 61 also has a vertically extending portion 63. The only difference between an endlock 61 and a windlock 60 is, in the case of the latter, a wing member 62 is also provided. The windlock wing member 62 engages the guide rail (e.g.) railing of the guide track 14 to prevent excessive bowing of the door 10 which could cause disengaging of the door from the railing. While the figures show an alternating configuration of windlocks 60 and endlocks 61, such alternating arrangement is not required. In fact, for the purposes of lateral force distribution in the case of frontal impact, the door will work equally well with different numbers and percentages of windlocks and endlocks. The chain assembly 57 can have an arrangement of these, or all of one type lock, or all of the other type lock.

It is noted that even though the windlocks and endlocks are referred to generally as forming a chain assembly 57, the windlocks and endlocks need not be connected to each other to actually form a "chain."

Figure 3B:
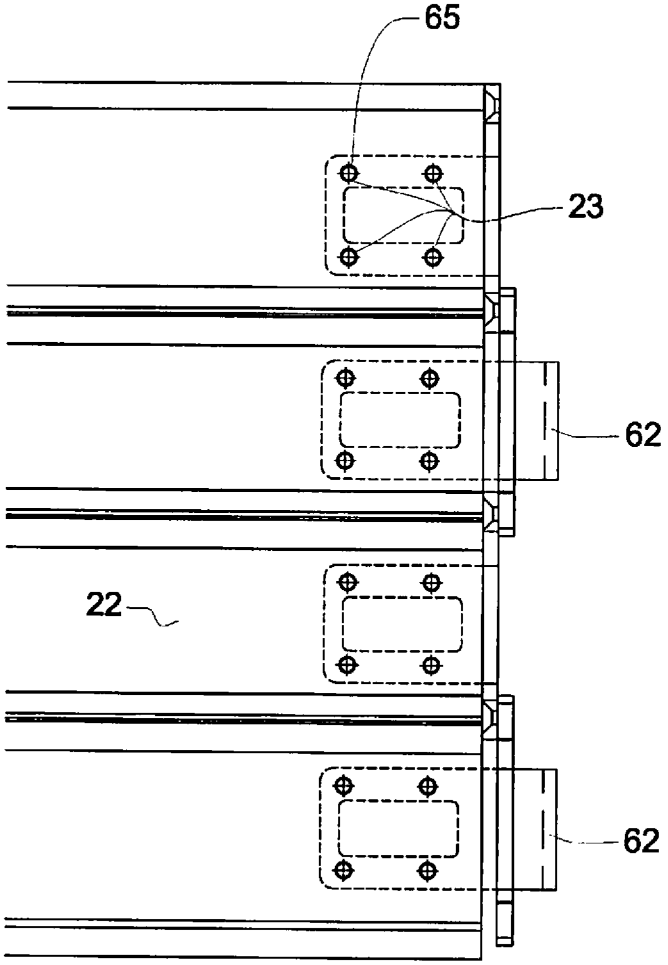

FIG. 3B shows the front panel slats 22 affixed to the chain assembly 57 by the use of rivets 65 attached through the aligned holes 23 and 59. As best seen in the side view of FIG. 3C, in the illustrated example utilizing alternating endlocks 61 and windlocks 60, each of the windlocks 60 is pivotally connected to an adjacent endlock 61 by a bolt 67. The connection is sufficiently secure to maintain the structural integrity of the door 10, while still allowing the door slats 22 to rotate between a flat position when the door is employed, to a curved position when the door is rolled on coil pipe 12. However, as discussed above, the chain assembly 57 does not necessarily need to have alternating endlocks and windlocks and may have different configurations and arrangements of these elements, including only endlocks, only windlocks, or any combination.

Figure 3C:
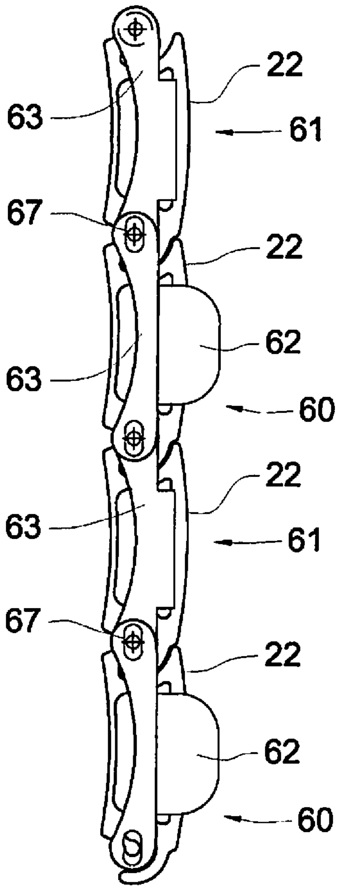
Figure 3D:
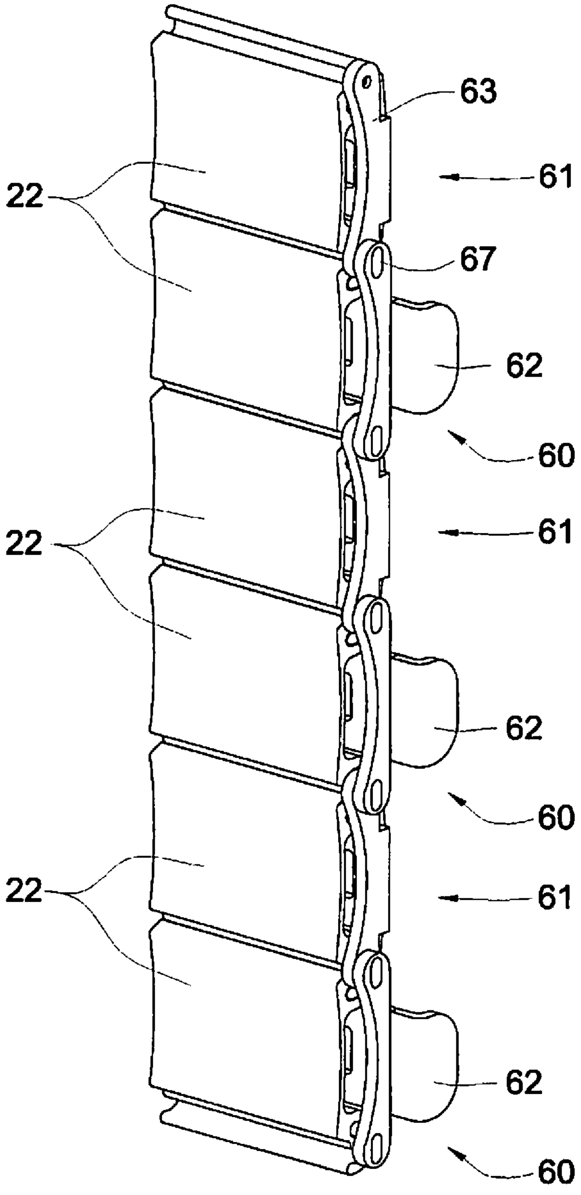

FIG. 3D is a rear perspective view of the assembly shown in FIG. 3C and shows a plurality of slats 22 having cavities 29, engaging each other in the manner discussed above, and also engaged with the chain assembly 57. The engaged hooks 32, 30, the bead 35 and the tapered tip 38 of the slats 22 provide a lateral reinforcement impact distribution structure configured to rotatably secure adjacent portions of adjacent slats 22 with one another, and to absorb, distribute and redirect impact transverse to the direction of lateral extension of the slatted door 10 to the direction along the length of the slats 22.

Although the use of the slats 22 will provide the advantages mentioned above, the overlapping of the vertically extending portion 63 of the various adjacent windlocks and endlocks also provides an impact distribution benefit by dispersing impact forces applied to the door slats 22.

This is so even if the ends of the vertically extending portions are not connected, e.g., bolted, to one another, but are simply in close proximity to each other. This is because the overlap of the ends of the vertically extending portions 63 absorbs and dissipates to adjacent extending portions any impact force that travels in the lengthwise direction of the slat. Thus, although embodiments are shown herein in which the ends of the vertically extending portions 63 are shown as being connected with, e.g., bolts, the overlap of the vertically extending portions 63 alone, i.e., without being bolted together, will also provide distribution of an impact force to adjacent slats.

Figure 4:
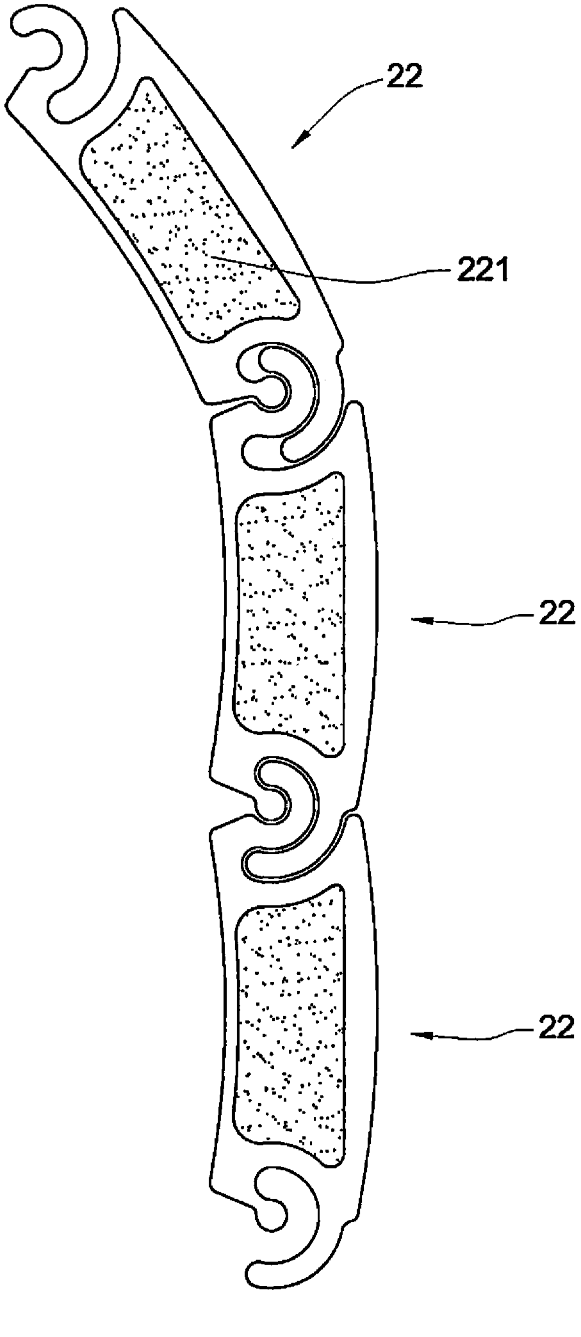
FIG. 4 shows connected slats of a door in accordance with an aspect of the invention in which each slat has an optional insulation core.

As shown in FIG. 4, each slat 22 can optionally have an insulation core 221 in the cavity 29 to provide, by way of non-limiting example, insulation, sound proofing and/or fireproofing.

Figure 5:
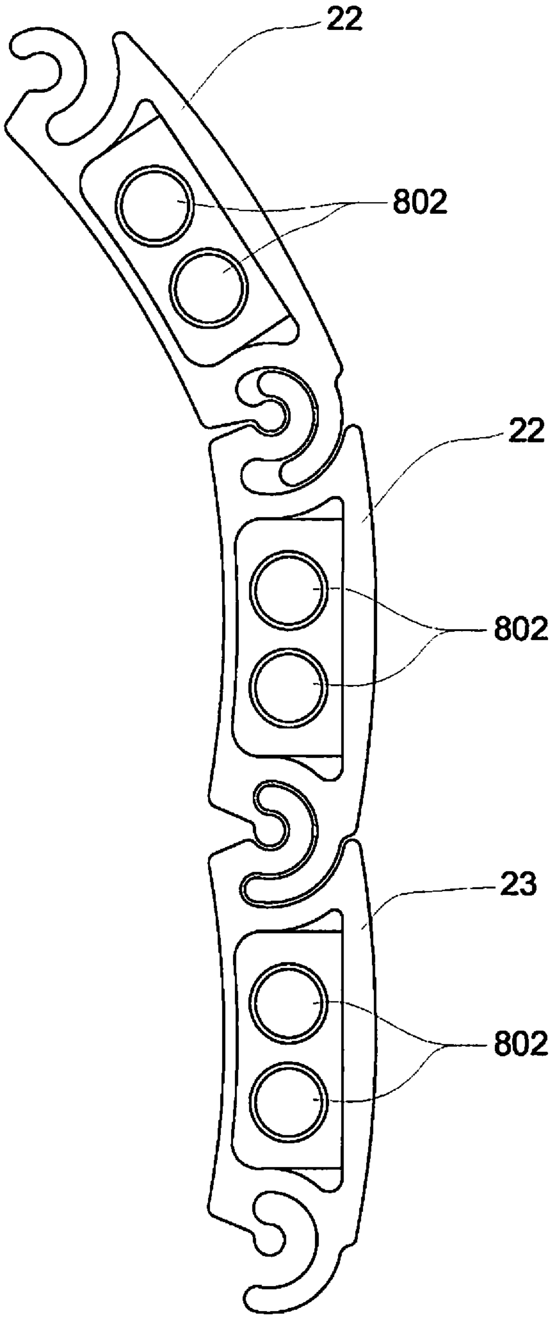
FIG. 5 shows connected slats of a door in accordance with an aspect of the invention in which each slat has stiffening inserts.

As discussed above, the engaged hooks 32, 30, the bead 35 and the tapered tip 38 of the slats 22 form a lateral reinforcement impact distribution structure According to another aspect of the present invention, another structure for providing lateral reinforcement impact force distribution may be realized by utilizing one or more stiffening inserts 802 in the cavity 29, as seen in FIG. 5. Such stiffening inserts 802 can optionally be used in addition to the lateral reinforcement impact distribution structure formed by the engaged hooks 32, 30, the bead 35 and the tapered tip 38 of the slats 22 discussed above.

FIG. 5 is a cross-sectional view of three exemplary interconnected reinforced slats 22 of a door 10. In this embodiment, each slat 22 has, arranged in the cavity 29, one or more stiffening inserts 802, (two are preferably shown). In the illustrated embodiment, the inserts are configured in the form of rods extending along the direction of the longitudinal extent of each slat. However, the invention is not limited to this particular embodiment and other types of inserts that can distribute force could be used instead or in addition.

Figure 6A:
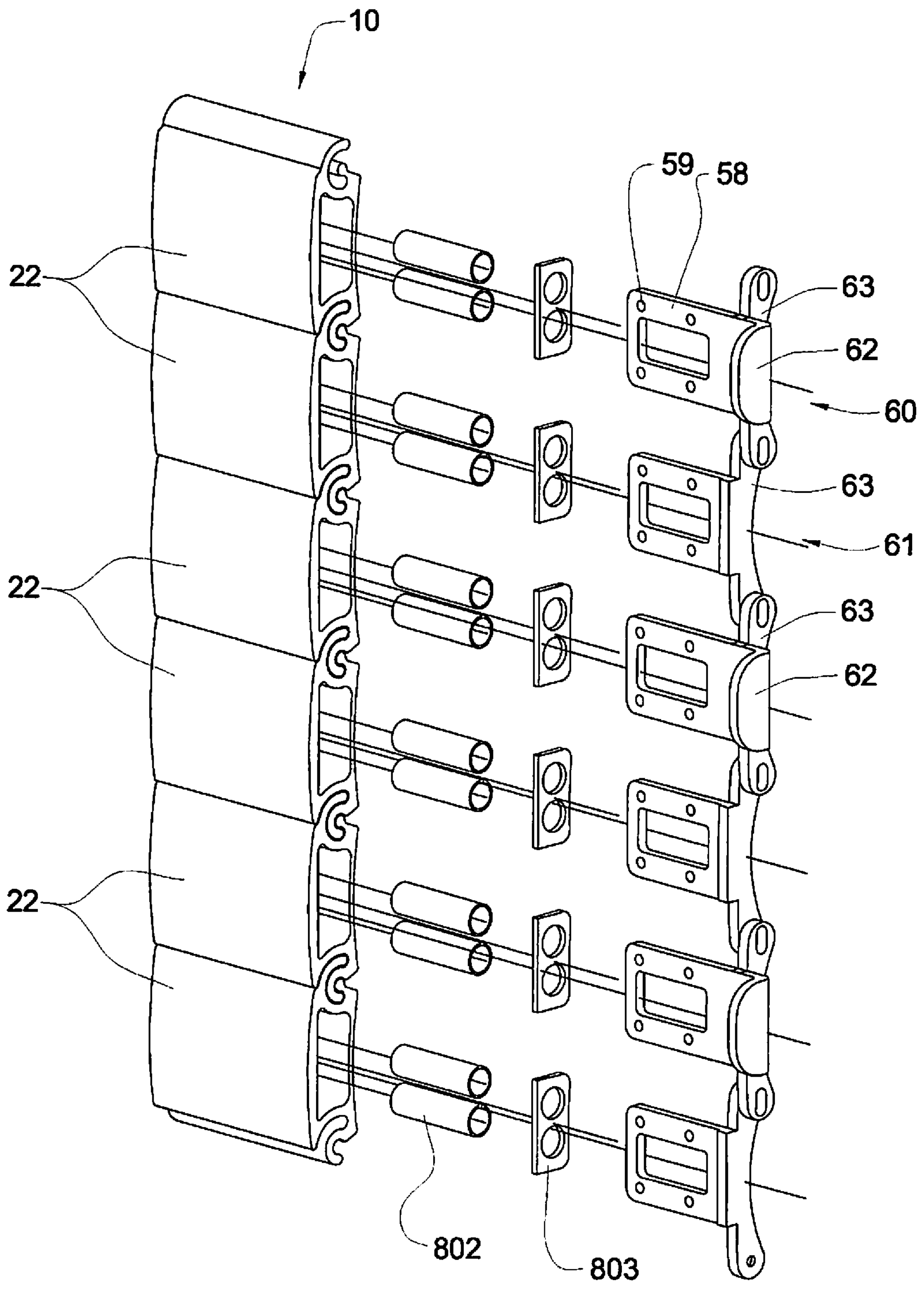
FIGS. 6A and 6B are views of slats of a door engaging with a chain assembly in accordance with an aspect of the present invention that includes stiffening inserts.
Figure 6B:
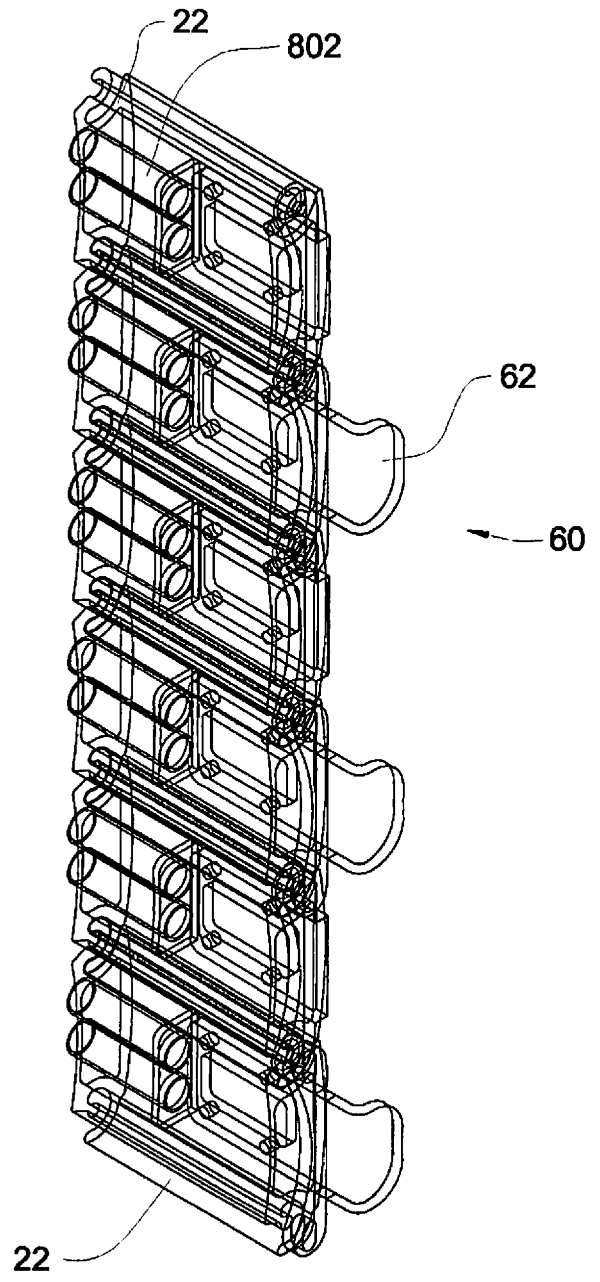

FIG. 6A is a front perspective exploded view corresponding to FIG. 3A but with the optional stiffening inserts 802 with insert brackets 803. The chain assembly 57 remains substantially unchanged from FIG. 3A and the reference numerals for that chain assembly 57 are carried over to FIG. 6A. FIG. 6B is an x-ray view of an assembled portion of the door 10 with the ends of the slats engaging the chain assembly 57.

In accordance with an aspect of the invention, the slats 22 can be extruded, stamped or cast, depending on the material used. Suitable material may include plastic, aluminum, steel, stainless steel, or any other material readily known to one of ordinary skill in the art that could be used to form the integrally formed slats as in the present invention. The thickness of the slats will vary depending on the material used and the environment in which the door is utilized. In an exemplary embodiment, the slats can be dimensioned as width of ⅞" to 1½", height of 2" to 4", and thickness of 1/16" to ⅜".

FIGS. 7A to 7E show a force distribution chain assembly 57' and illustrate how such an assembly 57' engages with a slatted door 10 in an aspect of the present invention. Force distribution chain assembly 57' comprises a series of end members, each of which is attached to an end of a door slat 22. In some configurations, the end members may be attached to adjacent end members, although it is not a requirement that the end member be attached to other end members.

More importantly, in one embodiment alternating ones of the end members have a vertically extending portion 63' (force dampener) which is configured to overlap with a portion of the edge of an adjacent slat. The overlap portions are arranged in a configuration with sufficient spacing such that a force applied to the front 24 of a slat (i.e., a "subject slat") will travel to the associated end member to, in alternating slats, the extending portion and then, as a result of the close proximity arrangement, to the extending portions 63' of slats one away from the adjacent slat. This arrangement provides a force dampening effect.

The end members can be in the form of an overlapping windlock 60' or a non-overlapping windlock 61'. Each of the end members, regardless of whether overlapping or non-overlapping, has an additional structure, referred to as a windlock wing member 62', which engages the railing of the guide track 14 to prevent excessive bowing of the door 10 which could cause disengaging of the door from the railing. In contrast to the embodiment of FIGS. 3A-3D, which used two types of end members only some of which had a windlock wing member, in this embodiment both types of end members have a windlock wing member 62'.

Figure 7A:
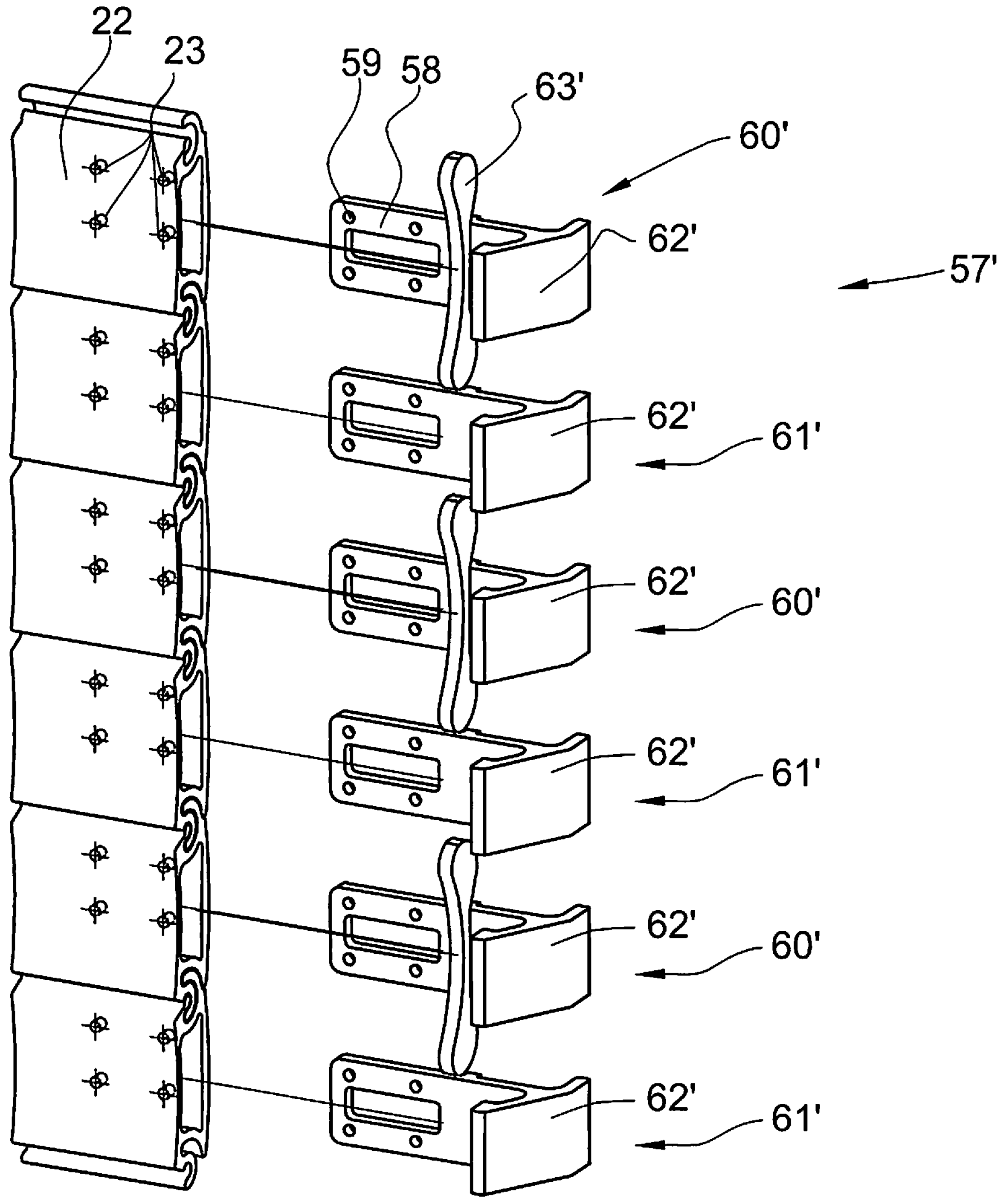
FIGS. 7A-7E are views of slats of a door engaging with a chain assembly in accordance with another aspect of the present invention.

FIG. 7A is an exploded view of an end of the door 10, made up of a plurality of the slats 22, and the chain assembly 57' to which the end of the door 10 is to be connected. The ends of each slat 22 have mounting holes 23 which, when the front panel slats 22 and the chain assembly 57' are lined up for connection, rivet holes 59' in a rectangular portion 58' of each windlock 60' and 61' are aligned.

Each overlapping windlock 60' has a vertically extending portion 63'. This portion is not provided on the non-overlapping windlock 61'. Thus, the only difference between windlock 61' and windlock 60' is the existence of portion 63'.

Figure 7C:
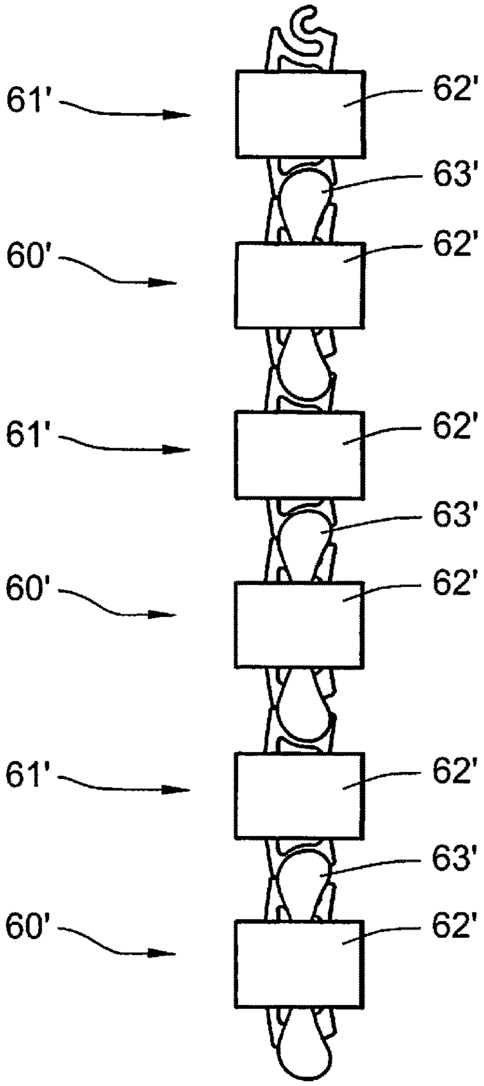
Figure 7B:
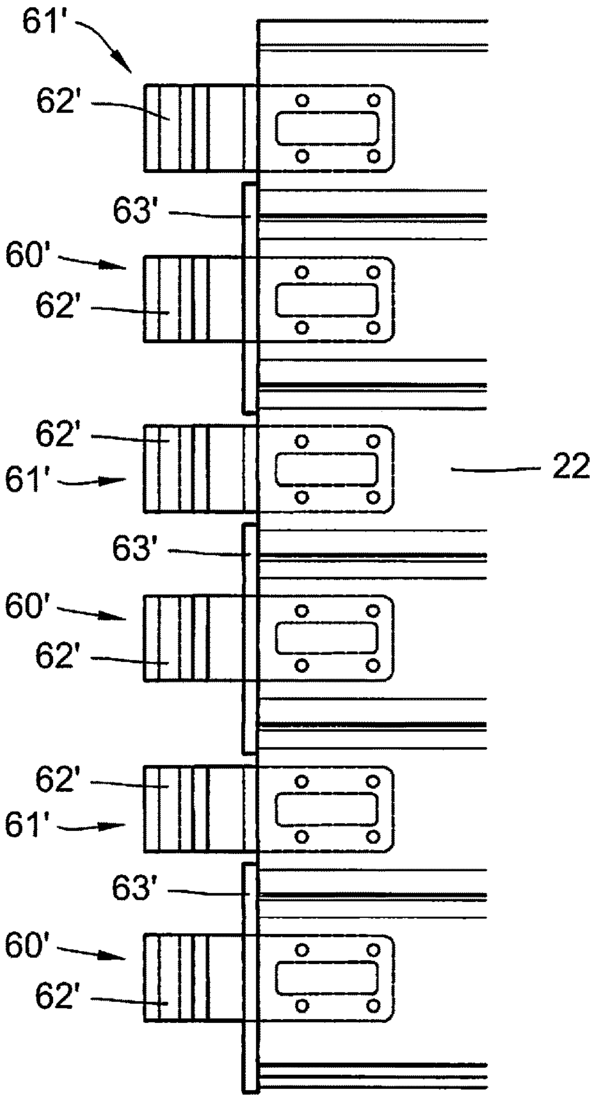
Figure 7D:
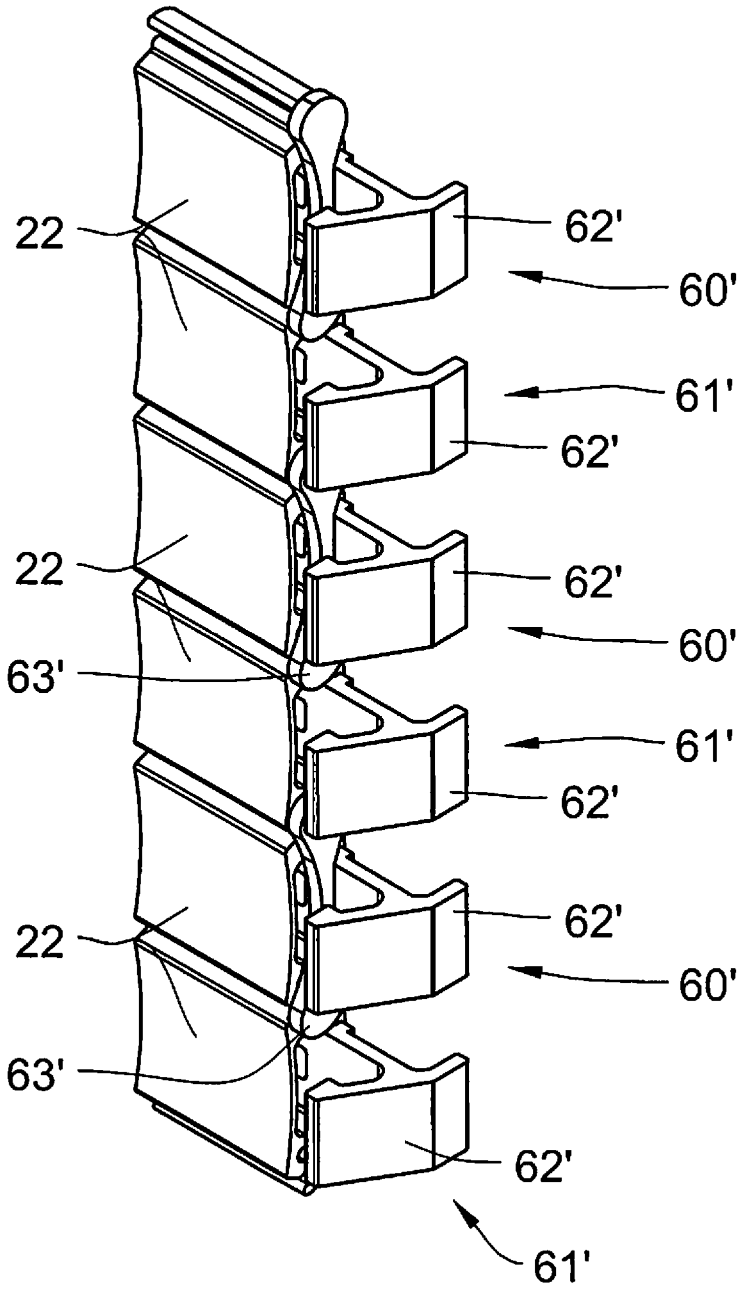
Figure 7E:
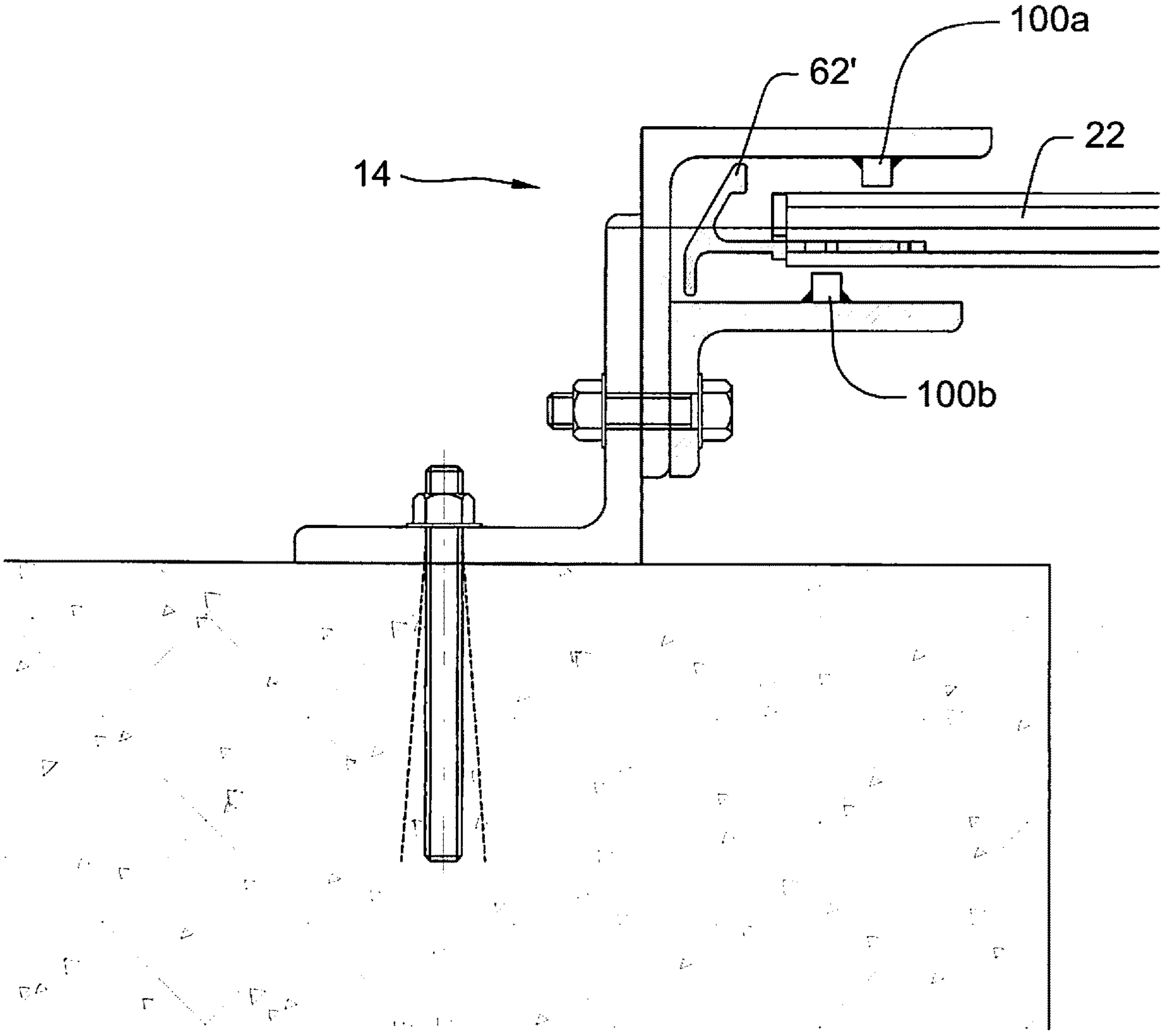

As seen in FIG. 7E the windlock wing member 62' engages the railing of the guide track 14 to prevent excessive bowing of the door 10 which could cause disengagement of the door from the railing. The shape of the wing member is configured so that, in the event of bowing of the door, the wing members 62' contact the protrusions **100*a* and 100*b* which are positioned within the railing at optimal points as shown. The protrusions are offset to allow the portions of the wing members 62' to engage them substantially simultaneously. The wing members are configured with angled portions, as explained below, to provide for a tighter and/or more uniform coiling of the door, and these angled portions dictate a staggering of the protrusions 100*a* and 100*b***.

Specifically, as can be seed in FIG. 7E, the wing members 62' are configured to allow for optimum contact with the protrusions **100*a* and 100*b***. Proceeding from right to left in that figure, each wing member has an overall asymmetrical T-shape with a straight portion at the base of the T being attached to the slats, as discussed above and below. The top of the T has a right angle portion and a slanted portion with an undercut. This shape in particular allows the slanted portion and the right angle portion both to contact their respective protrusions at approximately the same time, making for a stronger tendency to prevent the door from disengaging the railings. The slanted part of the T is in the shape of an angled parallelogram with the undercut proximate the angled front face.

While the figures show an alternating configuration of windlocks 60' and windlocks 61', such alternating arrangement is not required. In fact, for the purposes of lateral force distribution in the case of frontal impact, the door will work equally well with different numbers and percentages of the two types of windlocks. The chain assembly 57' can have an arrangement of these, or all of one type lock, or all of the other type lock.

It is noted that even though the windlocks are referred to generally as forming a chain assembly 57', the windlocks need not be connected to each other to actually form a “chain.”

FIG. 7B shows the front panel slats 22 affixed to the chain assembly 57' by the use of rivets, not shown in the figure, attached through the aligned holes 23 and 59'. As best seen in the side view of FIG. 7C, in the illustrated example utilizing alternating windlocks 61' and windlocks 62', each of the windlocks 60' is pivotally connected to an adjacent windlock 61' by, e.g., a bolt. The connection is sufficiently secure to maintain the structural integrity of the door 10, while still allowing the door slats 22 to rotate between a flat position when the door is employed, to a curved position when the door is rolled on coil pipe 12. However, as discussed above, the chain assembly 57' does not necessarily need to have alternating ones of the different types of windlocks and may have different configurations and arrangements of these elements, including only windlocks 60', only windlocks 61', or any combination.

FIG. 7D is a rear perspective view of the assembly shown in FIG. 7C and shows a plurality of slats 22, engaging each other in the manner discussed above, and also engaged with the chain assembly 57'. As discussed above, the engaged hooks 32, 30, the bead 35 and the tapered tip 38 of the slats 22 provide a lateral reinforcement impact distribution structure configured to rotatably secure adjacent portions of adjacent slats 22 with one another, and to absorb, distribute and redirect impact transverse to the direction of lateral extension of the slatted door 10 to the direction along the length of the slats 22.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed is:

1. A door assembly for covering an opening defined by at least one structural element of a building, the door assembly comprising:

a shutter roller positioned proximate the opening and rotatable about an axis of rotation;

a drive mechanism configured to rotate the shutter roller about the axis of rotation;

a flexible door having an outward face and windable on and off the shutter roller such that the flexible door is movable between retracted and extended positions by operation of the drive mechanism, the flexible door having a plurality of interconnected slats, each of the slats being integrally formed in one piece, each of the slats having two ends, an upper edge and a lower edge, and each of the slats being arranged along a direction perpendicular to a direction of travel of the door;

a guide rail assembly positioned at each side of the opening and extending along the direction of travel of the door; and a plurality of end members each attachable to ends of one of the slats, the upper edge of each of the slats having an upper hook portion having an inward curved portion and an outwardly curved portion, the outwardly curved portion defining an upper curved channel, the lower edge of each of the slats having a lower hook portion and a bead, which defines a lower curved channel the upper hook portion being configured to rotatably engage with the lower curved channel of the lower edge of an upper adjacent one of the slats so that the inward curved portion of the upper hook portion engages with the bead and the outwardly curved portion of the upper hook portion engages with an inwardly curved portion of the lower hook portion, and the lower hook portion configured to rotatably engage with the upper curved channel of the upper edge of a lower adjacent one of the slats, wherein at least when the upper adjacent slat is connected to the lower adjacent slat via the upper and lower hook portions and the lower and upper curved channels, the upper and lower adjacent slats engage one another along the upper and lower edges thereof to form a reinforcement impact distribution structure extending laterally along the length of the slats, and wherein the impact distribution structure is configured to:

(a) rotatably secure the slats to one another, and (b) direct an impact force applied to the door in a direction substantially along the length of said slats.

2. The door assembly according to claim 1, wherein at least one of the slats has a hollow portion filled with insulation.

3. The door assembly according to claim 1, wherein at least one of the slats has stiffening rods in a hollow portion of the slat.

4. The door assembly according to claim 1, wherein the slats are extruded, stamped or cast from a material.

5. The door assembly according to claim 4, wherein the material used is plastic, aluminum, steel, or stainless steel.

6. The door assembly according to claim 1, wherein the plurality of end members comprise at least one each from the group consisting of an overlapping windlock and a non-overlapping windlock and wherein the overlapping windlock has a vertically extending portion, and the non-overlapping windlock does not have the vertically extending portion.

7. The door assembly according to claim 6, wherein each of the overlapping, and non-overlapping windlocks, has a windlock wing member configured to engage a railing of a guide track to limit bowing of the door to reduce the likelihood of the door disengaging from the railing.

8. The door assembly of claim 7, wherein each of the wing members is configured as an asymmetrical T-shape with a straight portion at a base of the T connected to one of the slats, a right angle portion with respect to the base, and an acute angle portion with respect to the base, wherein the right angle portion and the acute angle portion, respectively, engage protrusions during a bowed state of the door.

9. The door assembly according to claim 6, wherein the plurality of end members comprise alternating ones of the overlapping and non-overlapping windlocks.

10. The door assembly according to claim 1, wherein the plurality of end members comprise at least one each from the group consisting of a windlock and an endlock and wherein the windlock has a windlock wing member configured to engage a railing of a guide track.

11. The door assembly according to claim 10, wherein the windlock, and the endlock, each has a vertically extending portion.

12. The door assembly according to claim 10, wherein the plurality of end members comprise alternating ones of the endlocks and the windlocks.

13. The door assembly according to claim 11, wherein the vertically extending portions are configured to connect ends of the slats to one another.

14. The door assembly according to claim 1, the outward face of each of the slats further comprising a tapered tip at the upper edge and a seat at the lower edge, wherein the tapered tip of the lower adjacent slat is supported in a seat of the upper adjacent slat when adjacent ones of the slats are in a flat configuration.

15. The door assembly according to claim 14, wherein the reinforcement impact distribution structure includes the bead, the upper hook, the lower hook and the tapered tip supported in the seat, which are aligned when adjacent ones of the slats are in a flat configuration.

* * * * *